_United States Patent_ [19]

Chester et al.

[11] 4,442,223

[45] * Apr. 10, 1984

[54] CATALYST AND CATALYST SUPPORT COMPOSITIONS

[75] Inventors: Arthur W. Chester, Cherry Hill; William A. Stover, Woodbury, both of N.J.

[73] Assignee: Mobil Oil Corporation, New York, N.Y.

[ * ] Notice: The portion of the term of this patent subsequent to Apr. 27, 1999 has been disclaimed.

[21] Appl. No.: 360,122

[22] Filed: Mar. 22, 1982

Related U.S. Application Data

[63] Continuation-in-part of Ser. No. 104,522, Dec. 17, 1979, Pat. No. 4,326,993.

[51] Int. Cl.³ .......................... B01J 21/16; B01J 29/06
[52] U.S. Cl. .......................................... 502/68; 502/64; 502/80; 502/263

[58] Field of Search .................. 252/455 Z, 455 R

[56] References Cited

U.S. PATENT DOCUMENTS 4,198,320 4/1980 Chester et al. .................. 252/455 Z
4,326,993 4/1982 Chester et al. .................. 252/455 Z _Primary Examiner_—Carl F. Dees
_Attorney, Agent, or Firm_—Alexander J. McKillop; Michael G. Gilman; Charles J. Speciale

[57] ABSTRACT

Cracking catalysts or catalyst supports prepared from mixtures comprising colloidal alumina, colloidal silica, a particulate weighting agent, and/or an active catalytic component possess excellent catalytic and physical properties. The catalysts in accordance with the invention also show excellent resistance to metal poisoning, and are also highly useful in non-cracking and/or hydroconversion processes.

18 Claims, No Drawings

CATALYST AND CATALYST SUPPORT COMPOSITIONS

This patent application is a continuation-in-part of patent application Ser. No. 104,522, filed Dec. 17, 1979; now U.S. Pat. No. 4,326,993.

BACKGROUND OF THE INVENTION

This application is directed to catalyst and catalyst support compositions prepared from mixtures of colloidal dispersions. The novel compositions possess excellent catalytic and physical properties and also exhibit excellent resistance to metal poisoning. These compositions are highly useful in cracking processes, particularly when zeolites are incorporated.

DESCRIPTION OF THE PRIOR ART

In U.S. Pat. No. 3,912,619, Magee and Dougherty prepare silica-alumina hydrogel catalysts by neutralizing silicate with 30-90% of the required alumina, aging the hydrogel, adding further alumina and drying. Catalyst pore structure is specified in this case as a majority of pores between 45 and 125 Å. In U.S. Pat. No. 3,933,621, high alumina, silica-alumina catalysts are prepared by cogelling silicate and aluminum sulfate by addition of base. Alumina content is 56-90%, preferably 65%. This patent also summarizes previous prior art for high alumina catalysts. In U.S. Pat. No. 4,010,116, cracking catalysts are prepared containing a peptized pseudoboehmite alumina gel, a synthetic micamontmorillonite, zeolite and a clay matrix component. Further, a series of recent patents deal with the use of "silica sols" in cracking catalysts: In U.S. Pat. No. 3,867,308 cracking catalysts are prepared by incorporating clay and zeolite in a silica sol prepared by rapid neutralization of sodium silicate with acid. An improvement is shown in U.S. Pat. No. 3,957,689 in which the rapid neutralization is performed with a mixture of sulfuric acid and aluminum sulfate. In U.S. Pat. No. 3,972,835, the silica sol is prepared by ion exchange of sodium silicate with an acidic ion exchange resin.

The effects of metal poisoning on the cracking performance of amorphous catalysts have been extensively investigated (U.S. Pat. No. 3,234,119); however, only recently have the effects been detailed for zeolitic cracking catalysts. As a result of such studies, it is now known that contaminant coke and hydrogen yields (coke and hydrogen produced by the metal poisoning) are lower on zeolitic than amorphous catalysts, but that metal activity is deactivated more rapidly on amorphous catalysts (Cimbalo et al, Oil & Gas Journal, May 15, 1972, p. 112). Therefore, a number of methods have been proposed to overcome the problems associated with the cracking of metal-contaminated feedstocks. For instance, U.S. Pat. No. 3,944,482 proposes the cracking of high metals content feedstock in the presence of a catalyst comprising 1 to 40 wt. % of a zeolite, having cracking characteristics, dispersed in a refractory metal oxide matrix having a large pore size distribution (about 50-100 Å). Also, U.S. Pat. No. 3,711,422 proposes that metal poisoned cracking catalysts can be partially restored with antimony compounds and U.S. Pat. No. 3,977,963 proposes that the effects of metal poisoning can be negated with bismuth or manganese compounds.

However, none of the above prior art features the unique combination of the mixed colloidal sol and the catalyst pore structure as embodied herein.

DESCRIPTION OF THE INVENTION

One or more objects of the present invention are accomplished by the provision of a composition adapted for application as a catalyst or catalyst support which is prepared by blending a mixture of components comprising (1) about 1-99 weight percent of colloidal dispersion of alumina particles, and (2) about 1-99 weight percent of colloidal dispersion of silica particles, and thereafter drying the resultant composite; said alumina and silica particles having diameters in the range of 10-10,000 Å and said composite having at least 40 weight percent of the 30-300 Å diameter pore volume in the range between 60-80 Å, and at least 25 percent of total 30 Å plus pore volume in the range between said 60-80 Å.

In another embodiment, the composition described above contains a particulate weighting agent (e.g., clay) and/or a hydrocarbon conversion component.

In a further embodiment, the present invention provides a composition adapted for application as a catalyst or catalyst support which is prepared by blending a mixture of components comprising (1) about 1-99 weight percent of colloidal dispersions of alumina particles, (2) about 1-99 weight percent of colloidal dispersions of silica particles, (3) about 1-75 weight percent of a particulate weighting agent, and (4) about 1-75 weight percent of crystalline aluminosilicate zeolite hydrocarbon conversion component selected from the group consisting of X, Y, erionite, mordenite and faujasite, and thereafter drying the resultant composite; said alumina and silica particles having diameters in the range of 10-10,000 Å and said particles having at least 40 percent of the 30-300 Å pore volume in the range between 60-80 Å, and at least 25 percent of total pore volume in excess of 30 Å being in the range of said 60-80 Å.

Compositions prepared by the method of this invention have excellent catalytic properties (selectivity, activity, stability) and physical properties (high density, moderate pore volume) and exhibit excellent resistance to the effects of metal poisoning. In addition, since colloidal dispersions of silica and alumina generally have only low levels of ionic contaminants, e.g., sodium, sulfate, the catalyst can be manufactured by a highly simplified process involving only mixing the components and drying the composite, i.e., no further chemical processing is necessary. Further, control of chemical composition and size of the colloidal silica and alumina particles allows control of both catalytic and physical properties.

The components of the catalyst material are described below in more detail. Colloidal refers to particles in the size range 10-10,000 Å (1-1000 mμ); in these catalysts colloidal particles in the range of 20-1000 Å are preferred.

(1) Alumina—colloidal alumina is available commercially. Dispersions are generally prepared by addition of the solid alumina to dilute acid solution (nitric, hydrochloric, acetic). Alternatively, alumina dispersions may be prepared from soluble aluminum salts (e.g., see Journal of Inorganic and Nuclear Chemistry, Vol. 35, pages 3691-3705, 1973).

(2) Silica—colloidal dispersions of silica are readily available commercially in many concentrations and particle sizes (e.g., Ludox, Nalcoag products). Alternatively, silica dispersions may be prepared from soluble silicates (e.g., see "Colloidal Silica" by R. E. Iler in E. Matijevic, Ed., "Surface and Colloid Science," Vo.. 6, J. Wiley, N.Y., 1973).

(3) Weighting agent—many types of weighting agents are available such as clay, alpha-alumina, zircon, mullite, alumina mono- or trihydrate, halloysite, sand, titania or other relatively inert materials.

(4) Cracking components—the most useful are rare earth exchanged forms of X or Y, or ammonium exchange X or Y.

Other zeolite catalytic materials useful in the catalysts herein include ZSM-4, ZSM-5, ZSM-11, ZSM-12, ZSM-35, ZSM-38 and other similar materials, such as erionite, mordenite and faujasite.

This invention is also directed to catalysts as embodied herein having further utility of for example as CO-oxidation catalysts. Such catalysts may also be promoted with for example the addition of small amounts (about 0.1-100 ppm) of a platinum group metal, i.e., platinum, palladium, rhenium, osmium, iridium, rhodium or ruthenium. This particular aspect of the invention is more fully described below.

Clays are preferred weighting agents. Clays of the attapulgite, montmorillonite and kaolin families, including those which families include the sub-bentonites and the kaolins commonly known as Dixie, McNamme-Georgia and Florida clays or others in which the main mineral constituent is halloysite, kaolinite, dickite, illite, nacrite or anauxite and activated carbons. Bauxite, attapulgite and fuller's earth are preferred. Such clays can be used in the raw state as originally mined or initially subjected to calcination, acid treatment or chemical modification. Clays having a particle size from about 0.5 to 5 microns are generally used.

The catalysts or supports are generally prepared by mixing the colloidal silica and alumina components and the weighting agent and/or zeolite components in appropriate proportions, then drying the composite by suitable methods. For example, zeolitic fluid cracking catalysts are prepared by addition of the colloidal alumina to a slurry of clay in colloidal silica, then adding the zeolite component and spray drying the composite to form microspheroidal particles of suitable size. Alternatively, the mixture may be oven or flash dried, then formed into suitable particles (pellets, extrudate). Further, the mixture may be adjusted to suitable concentration and temperature to form bead type catalyst particles. Hydrocracking catalysts can be prepared similarly. Catalyst supports and amorphous cracking catalysts can be prepared without inclusion of zeolite component in any of the above forms.

The silica and alumina dispersions are each generally monodispersed (primarily particles of the same size) but mixtures of monodispersed particles may be used to alter the matrix structure. The silica and alumina particle sizes are in general different.

The mixing of the components may be performed in any order, although the order of addition of the colloidal alumina and silica may affect the properties. Alternatively, all the components or suitable mixtures can be mixed simultaneously in a suitable mixing device, thus eliminating the need for large mixing vessels in the manufacturing process. The catalyst compositions may be specified as follows:

(1) The synthetic matrix portion is substantially formed by mixing colloidal silica and alumina such that the alumina or silica content is 1-99 wt. %, and preferably 10-80 wt. % silica and 20-90 wt. % alumina.

(2) The particulate weighting agent, e.g., clay, can constitute from 1 to 75 wt. % of the dried catalyst composite.

(3) The zeolite component can constitute 1 to 75 wt. % of the dried catalyst composite, and preferably will be in the range of 5-35% when included.

An important use of the catalysts prepared in this manner is in the catalytic cracking of high boiling hydrocarbon feedstocks to valuable lower boiling liquid products. Such chargestocks include gas oils, vacuum or atmospheric residua, or even whole or reduced crudes. The products include fuel oils, gasoline and lighter products. The cracking process, which includes a hydrocarbon conversion (cracking) phase and a regeneration phase, to remove coke formed on the catalyst during cracking and provide process heat, may be of the moving bed type (TCC, Houdriflow) or more importantly, one of the many available fluid cracking processes. In applying these catalysts to commercial fluid catalytic cracking operations, the important catalyst properties are as follows:

Catalyst Activity and Stability: Cracking catalysts generally deactivate by contact with water vapor formed during regeneration; thus high stability toward hydrothermal deactivation is required to maintain activity during regeneration. In addition, a catalyst composition that gives high activity and stability at a given zeolite content can minimize catalyst cost by reducing the required zeolite content for a given catalyst activity.

Catalyst Selectivity: Catalysts that maximize the yield of liquid products (gasoline, fuel oil, butanes) and minimize catalytic coke yields and light gases provide the most profitable operations.

Attrition Resistance: Catalysts circulating in FCC units break up (attrit) by many mechanisms and are lost from the unit; thus high attrition resistance is desirable.

The method used for attrition measurement involves contacting 7 cc. of catalysts in a 1 in. i.d. "U" tube with an air jet formed by passing humidified (60%) air at 21 liters/min. through a 0.07 in. diameter nozzle. The test is performed in the Roller apparatus. Fines in the $0-14\mu$ range are removed as formed and caught in a paper collection thimble. At the conclusion of the attrition phase, the particle size of the residue is determined; the incremental weight of the collection thimble is added to the $0-20\mu$ friction.

The attrition index is defined as the increase in the fines fraction $(0-20\mu)$ caused by the attrition phase:

$$\text{Attrition index} = 100 \times \frac{WA - WB}{100 - WB} \times \text{packed density}$$

where
WA=wt. % in $0-20\mu$ fraction after attrition.
WB=wt. % in $0-20\mu$ fraction before attrition.
The packed density is needed as a constant volume of catalyst is used.

Physical Properties: Both (packed) density and pore volume are important parameters. Catlaysts of high density are more easily retained in FCC units, since they are less subject to loss by elutriation. In general, for a given type of catalyst, attrition resistance increases with increasing density and decreasing pore volume; while low pore volumes are desirable, too low a pore volume can lead to selectivity losses due to diffusional restrictions. Desirable values are therefore a compromise:

| | |
|---|---|
| Packed Density | 0.70–0.90 gm/cc |
| Pore volume | 0.30–0.45 cc/gm (H$_2$O) |

Metal Resistance: The ability to resist activity and selectivity loss caused by metal poisons (Ni, V, Cu, Fe) deposited from the chargestock is also important, particularly on applications involving cracking of high metal stocks such as residua, hydrotreated residua, whole or reduced crudes. In general, metal poisons cause increased "contaminant" yields of coke and hydrogen, reducing product yields and reducing cracking capacity.

Pore Size Distribution: The pore size distribution of catalysts of this invention differs from other types of cracking catalysts. The pore size distributions presented hereinafter are normalized to a 30–300 Å basis. A considerable fraction of the pore volume occurs in pores greater than 300 Å. Most, if not all, of these larger pores actually represent interparticle voids created by the loose packing of the spheroidal catalyst particles and are unimportant when the catalyst functions in a fluidized bed. Pore size distribution is determined by measuring the amount of a fluid (in this case, mercury in cc/gram) forced into the pore structure as a function of pressure. As pressure increases, the mercury is forced into smaller and smaller pores. The specific pore sizes are determined by a standard capillary tube equation. With mercury, the determination is limited to pore sizes of 30 Å and above.

The following examples are not meant to limit the invention but are merely exemplary of preferred embodiments.

Detailed examples are provided below for zeolitic and amorphous cracking catalysts, with specific reference to the properties described above.

DESCRIPTION OF SPECIFIC EMBODIMENTS

EXAMPLE 1

Rare Earth Y and Low Sodium Rare Earth Y

A rare-earth exchanged zeolite Y, which had been calcined for about 10 minutes at 1200° F. and had the composition 3.17% Na, 61.4% SiO$_2$, 21.7% Al$_2$O$_3$ and 15.9% RE$_2$O$_3$ (Ex. 1A) was treated with 5% ammonium sulfate solution at 180° F. After filtration, the treated zeolite was further treated twice with 12.5% rare earth chloride solution at 180° F., then filtered, washed and dried at 250° F. The product low sodium (0.65% Na) REY (Ex. 1B) was incorporated in the catalysts of Examples 2–6.

EXAMPLES 2–6

Mixed Silica-Alumina vs Pure Silica or Alumina

A series of catalysts were prepared by mixing colloidal dispersions of silica and alumina particles, adding clay as a weighting agent and the REY of Ex. 1B as the active component.

The colloidal silica was obtained as a commercial preparation with 30% SiO$_2$, 0.1% Na$_2$O and a particle diameter of 17 millimicrons.

The colloidal alumina was prepared by dispersing a commercial spray dried alumina, which contains 90% alumina monohydrate (77% Al$_2$O$_3$) with a particle diameter of 4.8 millimicrons, in an aqueous solution containing 0.6% concentrated (70%) nitric acid.

The catalysts were prepared by mixing the clay with colloidal silica (except where only alumina was used), then mixing appropriate quantities of the colloidal dispersions of silica and alumina (except where pure silica or alumina was used), then mixing in the low sodium REY of Ex. 1B. The composites were then spray dried with an air inlet temperature of 700° F. and an outlet temperature of 350° F. to obtain the finished dried catalysts.

The catalysts were each given a thermal treatment consisting of adding the catalyst slowly to a flow of steam at 1200° F., then calcining in nitrogen (or air) at 1200° F. in a fluidized bed for an additional 30 minutes. The thermal treatment simulates the condition of fresh catalyst immediately after addition to the regenerator of a commercial fluid cracking unit. The thermally treated catalysts were tested for cracking activity and selectivity by cracking a wide-cut Mid-continent gas oil (WCMCGO) at 915° F., 2 C/O, 12.5 WHSV in a fixed fluidized bed. The properties of the gas oil are given in Table 1.

In addition, each catalyst was mildly steamed by treating the catalyst for 4 hours at 1400° F. and 0 psig with 100% steam in a fluidized bed, simulating the hydrothermal deactivation occurring in commercial fluid cracking units. The mildly steamed catalysts were treated under the same conditions as the thermally treated catalysts (915° F., 2 C/O, 12.5 WHSV, WCMCGO) as well as at a higher severity, 920° F., 3 C/O, 8.33 WHSV, WCMCGO.

The catalyst compositions, physical, chemical and catalytic properties are listed in Table 2, For the mixed silica-alumina catalysts, the order of mixing the colloidal dispersions are also specified.

The data in Table 2 demonstrates that, in comparison to the catalysts in which only silica or alumina is present in the synthetic portion of the matrix, the mixed silica-alumina catalysts (Ex. 3, 4, 5) are higher in density, more attrition resistant, more active for cracking, more selective (lower coke yield at constant conversion) and more stable in that less activity is lost by hydrothermal deactivation.

EXAMPLES 7–12

Variation of Composition

The calcined rare earth zeolite Y (REY) of Ex. 1A was incorporated in this series of catalysts in which the colloidal silica, colloidal alumina and clay contents were varied. The method of preparation was the same as the previous examples. In Ex. 12, only the REY was slurried with half of the colloidal silica, the colloidal alumina then added, followed by addition of the remaining silica.

Each catalyst was given a thermal treatment as well as a mild steaming as described in previous examples. In addition, each catalyst was severely steamed by treating the catalyst for 4 hours at 1475° F., 0 psig with 100% steam in a fluidized bed. The severe steaming simulates the effect of severe hydrothermal deactivation sometimes encountered in commercial fluid cracking units. The catalysts were tested for cracking activity at the conditions described above.

The catalyst compositions, physical, chemical and catalytic properties are listed in Table 3. The data in Table 3 demonstrate that over a wide range of alumina contents, clay contents and alumina to silica ratios, the catalysts of this invention show excellent cracking activity, hydrothermal stability, high density and excellent attrition resistance. The zeolite catalysts described in Ex. 1–12, as well as others of this nature, may, by the incorporation of suitable hydrogenation components, be used for hydrocracking. Such components include, for example, cobalt and molybdenum oxides, nickel and tungsten oxides, as well as noble metals, e.g., palladium. Such components may be incorporated by standard methods, such as impregnation or ion exchange.

EXAMPLES 13–14

Non-Zeolite Catalysts

Two catalysts were prepared by the methods described above, but no zeolite component was added. The catalysts were mildly steamed and tested for cracking activity with WCMCGO at a more severe condition than for zeolitic catalysts: 925° F., 5 C/O, 5 WHSV. The compositions, physical and catalytic properties are listed in Table 4, and compared with a commercial silica-alumina cracking catalyst. The catalysts of this invention have higher activity and density than the commercial catalyst and are more selective. These catalysts also may be used as supports for other applications, e.g., hydrotreating, hydrocracking, reforming, wherein the appropriate active components are incorporated on the catalyst by suitable methods such as impregnation. Such active components include, for example, cobalt and/or nickel and molybdenum oxides for hydrotreating, platinum and/or other noble metals for reforming and others well known to those skilled in the art.

EXAMPLE 15

Metal Resistance

The catalysts of Ex. 2, 3, 5 and 6 were tested for resistance to poisoning by metals as follows: the mildly steamed catalysts were impregnated at ambient temperature with a WCMCGO chargestock containing about 1700 ppm each Ni and V as naphthenates diluted with xylene to a total volume sufficient to just fill the catalyst pores. The ratio of catalyst-to-chargestock was 5 wt/wt., so that the impregnated catalysts contained about 340 ppm each Ni and V. After evaporation of the xylene at 250° F., the impregnated samples were heated to 980° F. in a stream of nitrogen in a fixed fluidized bed, then held at 980° F. for 10 minutes, allowing the impregnated chargestock to crack and deposit the metals and coke on the catalyst. The coke was removed by oxidation in air at 1200° F. and the catalysts tested at 920° F., 3 C/O, 8.33 WHSV, WCMCGO. Since activities differed, estimates of coke and hydrogen yields were made at a constant (75% vol.) conversion to allow direct comparison. The results are shown in Table 5 and demonstrate that the mixed silica-alumina catalysts produce relatively low contaminant yields; the pure silica and alumina catalysts give much higher contaminant yields.

EXAMPLE 16

Pore Size Distribution

The pore size distribution of the catalysts of Examples 3, 5, 7–12 after the mild steaming are listed in Table 6.

The steamed catalysts are characterized by having at least 40% of their pore volume in the 30–300 Å diameter range between 60 and 80 Å and at least 25% of the total pore volume in the same (60–80 Å) range.

Pore size distributions for the thermally treated catalysts of Examples 3 and 5 are listed in Table 7; a comparison is given with the catalyst prepared with colloidal silica only (Example 2). The effect of steaming on the pore structure is also shown in Table 7: the pore size distribution is shifted by steaming, but remains sharp. The pore size distribution of some typical commercial catalysts after thermal and steam treatment are listed in Table 8. The catalyst classification is according to that given by J. S. Magee and J. J. Blazek in a paper appearing on page 615 of "Zeolite Chemistry and Catalysis," edited by J. A. Rabo, published as ACS Monograph 171 by the American Chemical Society in Washington, D.C. in 1976. None of these catalysts show distributions similar to the mixed sol catalysts and show considerable broadening upon steaming.

The data illustrated in Tables 6, 7 and 8 establishes the fact that the catalysts prepared from mixed colloidal dispersions having a pore structure in accordance with the invention embodied herein possesses unique and novel characteristics heretofore unknown in the art.

TABLE 1

| Properties of Wide-Cut Mid-Continent Gas Oil (WCMCGO) | |
|---|---|
| API Gravity | 29.2 |
| Sulfur, % Wt. | 0.51 |
| Nitrogen, % Wt. | 0.065 |
| Basic Nitrogen, ppm | 152 |
| Conradson Carbon, % Wt. | 0.29 |
| Aniline Point, °F. | 181 |
| Bromine Number | 2.5 |
| Refractive Index at 70° F. | 1.48852 |
| Pour Point, °F. | 85 |
| Viscosity, KV at 210° F. | 3.55 |
| Molecular Wt. | 328 |
| Hydrogen, % Wt. | 13.06 |
| Specific Gravity, 60/60° F. | 0.8767 |
| Metals: | |
| Ni, ppm | 0.1 |
| V, ppm | 0.2 |
| Fe, ppm | 32 |
| Distillation, °F. | |
| IBP | 472 |
| 5% vol | 545 |
| 10 | 578 |
| 20 | 608 |
| 30 | 632 |
| 40 | 665 |
| 50 | 707 |
| 60 | 754 |
| 70 | 796 |
| 80 | 851 |
| 90 | 920 |
| 95 | 958 |

TABLE 2

| Example No. | 2 | 3 | 4 | 5 | 6 |
|---|---|---|---|---|---|
| Order of Addition | — | a | b | b | — |
| Composition: | | | | | |
| $SiO_2$, % wt. | 63.75 | 44.69 | 23.55 | 23.84 | 0 |
| $Al_2O_3$, % wt. | — | 17.20 | 36.27 | 36.72 | 57.58 |
| Clay, % wt. | 21.25 | 22.34 | 23.55 | 23.84 | 24.90 |
| REY, % wt. | 15.00 | 15.77 | 16.63 | 15.60 | 17.58 |
| Synthetic Matrix:[c] | | | | | |
| $Al_2O_3$, % wt. | — | 27.8 | 60.6 | 60.6 | 100 |
| $Al_2O_3/SiO_2$, wt/wt | 0 | 0.38 | 1.54 | 1.54 | ∞ |
| Chemical: | | | | | |
| Na, % wt. | 0.31 | 0.23 | 0.19 | 0.18 | 0.07 |
| $RE_2O_3$, % wt. | 3.77 | 3.73 | 4.19 | 3.81 | 3.12 |
| Physical: | | | | | |
| Pore Volume,[d] cc/gm | 0.20 | 0.33 | 0.39 | 0.39 | 0.40 |
| Packed Density,[d] gm/cc | 0.71 | 0.77 | 0.81 | 0.76 | 0.69 |
| Surface Area[d], m²/gm | 191 | 177 | 231 | 215 | 170 |

TABLE 2-continued

| Example No. | 2 | 3 | 4 | 5 | 6 |
|---|---|---|---|---|---|
| Mean Particle Diam., | 78 | 50 | 35 | 38 | 40 |
| Attrition Index[e], 0–20μ | 21 | 0 | 0 | 4 | 27 |
| Cracking Activity (Conv., % Vol.): | | | | | |
| Thermally Treated Catalyst at 2 C/O[f] | 77.8 | 82.8 | 85.3 | 83.6 | 82.5 |
| Mildly Steamed Catalyst | | | | | |
| at 2 C/O[f] | 70.4 | 79.3 | 82.4 | 81.7 | — |
| at 3 C/O[g] | 77.9 | 84.0 | 87.4 | 86.7 | 83.0 |
| Est. Coke Yield, % Wt. at 75% Conv. | 3.6 | 2.8 | 3.1 | 2.8 | 3.0 |
| Stability: | | | | | |
| % Activity Loss[h], 1200–1400° F. | 9.5 | 4.2 | 3.4 | 2.3 | — |

[a]1 - $Al_2O_3$ added to $SiO_2$
[b]$SiO_2$ added to $Al_2O_3$
[c]$SiO_2$, $Al_2O_3$ components only
[d]Thermally treated catalyst
[e]Calcined at 1000° F. for 1 hr.
[f]915° F., 2 C/O, 12.5 WHSV, WCMCGO, fixed fluidized bed
[g]920° F., 3 C/O, 8.33 WHSV
[h]From activities at conditions of footnote f

TABLE 3

| Example No. | 7 | 8 | 9 | 10 | 11 | 12 |
|---|---|---|---|---|---|---|
| Order of Addition: | a | a | a | a | a | b |
| Composition: | | | | | | |
| $SiO_2$, % wt. | 27.0 | 26.5 | 17.9 | 10.8 | 13.2 | 17.9 |
| $Al_2O_3$, % wt. | 34.6 | 22.6 | 30.6 | 37.1 | 22.7 | 30.6 |
| Clay, % wt. | 22.5 | 35.3 | 35.8 | 36.1 | 48.5 | 35.8 |
| REY, % wt. | 15.9 | 15.6 | 15.8 | 16.0 | 15.6 | 15.8 |
| Synthetic Matrix:[c] | | | | | | |
| $Al_2O_3$, % wt. | 56.2 | 46.0 | 63.1 | 77.4 | 63.1 | 63.1 |
| $Al_2O_3/SiO_2$, wt/wt | 1.28 | 0.86 | 1.70 | 3.40 | 1.70 | 1.70 |
| Chemical: | | | | | | |
| Na, % wt. | 0.54 | 0.54 | 0.48 | 0.46 | 0.47 | 0.51 |
| $RE_2O_3$, % wt. | 3.00 | 2.80 | 2.71 | 2.85 | 2.72 | 2.83 |
| Physical: | | | | | | |
| Pore Volume,[d] cc/gm | 0.38 | 0.34 | 0.34 | 0.34 | 0.35 | 0.38 |
| Packed Density,[d] gm/cc | 0.79 | 0.78 | 0.79 | 0.66 | 0.80 | 0.80 |
| Surface Area,[d] m²/gm | 222 | 193 | 187 | 194 | 167 | 194 |
| Mean Particle Diam., μ | 45 | 41 | 42 | 44 | 52 | 41 |
| Attrition Index[e], 0–20μ | 2 | 3 | 3 | 18 | 11 | 6 |
| Cracking Activity (Conv., % Vol.): | | | | | | |
| Thermally Treated Catalyst at 2 C/O[f] | 80.6 | 82.7 | 81.5 | 83.8 | 82.7 | 83.2 |
| Mildly Steamed Catalyst | | | | | | |
| at 2 C/O[f] | 75.2 | 77.7 | 79.8 | 79.7 | 78.4 | 79.2 |
| at 3 C/O[g] | 80.8 | 84.2 | 83.7 | 84.5 | 86.3 | 85.2 |
| Severely Steamed Catalyst | | | | | | |
| at 3 C/O[g] | 76.3 | 78.5 | 79.8 | 81.7 | 83.1 | 80.2 |
| Stability: | | | | | | |
| % Activity Loss[h], 1200–1400° F. | 6.7 | 6.0 | 2.1 | 4.9 | 5.2 | 4.8 |
| % Activity Loss[i], 1400–1475° F. | 5.6 | 6.8 | 4.7 | 3.3 | 3.7 | 5.9 |

[a]$Al_2O_3$ added to $SiO_2$
[b]REY added to 50% of $SiO_2$ prior to $Al_2O_3$ addition, remainder of $SiO_2$ after $Al_2O_3$ addition
[c]$SiO_2$, $Al_2O_3$ components only
[d]Thermally treated catalyst
[e]Calcined at 1000° F. for 1 hr.
[f]915° F., 2 C/O; 12.5 WHSV, WCMCGO, fixed fluidized bed
[g]920° F., 3 C/O; 8.33 WHSV, WCMCGO, fixed fluidized bed
[h]From activities at conditions of footnote f
[i]From activities at conditions of footnote g

TABLE 4

| Example No. | 13 | 14 | Commer. Si—Al |
|---|---|---|---|
| Composition: | | | |
| $SiO_2$, % wt | 39.65 | 26.95 | 87 |
| $Al_2O_3$, % wt | 33.92 | 46.10 | 13 |
| Clay, % wt | 26.43 | 26.95 | — |

TABLE 4-continued

| Example No. | 13 | 14 | Commer. Si—Al |
|---|---|---|---|
| Synthetic Matrix:[a] | | | |
| $Al_2O_3$, % wt | 46.1 | 63.1 | 13 |
| $Al_2O_3/SiO_2$ (wt/wt) | 0.86 | 1.7 | 0.15 |
| Physical | | | |
| Pore Volume,[b] cc/gm | 0.39 | 0.37 | 0.62 |
| Packed Density,[b] gm/cc | 0.81 | 0.76 | 0.59 |
| Surface Area,[b] m²/gm | 128 | 125 | 188 |
| Mean Particle Diam., μ | 37 | 41 | — |
| Attrition Index,[c] 0–20μ | 6 | 9 | — |
| Cracking Activity (Conv., % Vol) | | | |
| Mildly Steamed Catalyst at 5 C/O[d] | | | |
| Conversion, % Vol. | 60.7 | 60.2 | 55.7 |
| $C_5$ + Gasoline, % Vol. | 51.2 | 48.6 | 41.8 |
| Coke, % wt. | 2.7 | 3.3 | 3.0 |

[a]$SiO_2$, $Al_2O_3$ only
[b]Mildly steamed catalyst
[c]Calcined 1000° F., 1 hour
[d]925° F., 5 C/O, 5 WHSV, WCMCGO, fixed fluidized bed

TABLE 5

| Example No. | 2 | 3 | 5 | 6 |
|---|---|---|---|---|
| $Al_2O_3$, % Wt of Syn. Matrix | 0 | 27.8 | 60.6 | 100 |
| Conversion, % Vol., [a,b] | 76.5 | 82.7 | 85.6 | 76.3 |
| Est. Coke, % Wt at 75% Vol. Conv. | 5.8 | 4.6 | 3.6 | 7.3 |
| Est. $H_2$, SCF/Bbl at 75% Vol. Conv. | 141 | 210 | 145 | 371 |

[a]Catalysts poisoned with 340 ppm each Ni and V
[b]920° F., 3 C/O, 8.33 WHSV, WCMCGO, fixed fluidized bed

TABLE 6

Pore Structure of Steamed[a] Mixed Sol Catalysts

| Synthetic Matrix $Al_2O_3$ / $SiO_2$ | 0.38 | 1.54 | 1.28 | 0.86 | 1.70 | 3.40 | 1.70 | 1.70 |
|---|---|---|---|---|---|---|---|---|
| Example No. | 3 | 5 | 7 | 8 | 9 | 10 | 11 | 12 |
| Pore Volume, cc/gm | 0.34 | 0.39 | 0.36 | 0.34 | 0.37 | 0.38 | 0.34 | 0.33 |
| Distribution, % of 30 Å+ | | | | | | | | |
| 30–50 Å | 11 | 6 | 6 | 7 | 7 | 4 | 5 | 7 |
| 50–60 | 19 | 9 | 8 | 8 | 7 | 4 | 5 | 7 |
| 60–70 | 19 | 20 | 15 | 13 | 17 | 10 | 10 | 13 |
| 70–80 | 8 | 19 | 20 | 18 | 16 | 13 | 10 | 20 |
| 80–90 | 2 | 3 | 13 | 11 | 5 | 11 | 8 | 10 |
| 90–100 | 1 | 3 | 6 | 4 | 2 | 3 | 4 | 4 |
| 100–150 | 3 | 3 | 7 | 6 | 4 | 6 | 6 | 6 |
| 150–200 | 1 | 2 | 2 | 2 | 2 | 3 | 3 | 3 |
| 200–300 | 1 | 2 | 2 | 4 | 3 | 4 | 4 | 3 |
| 300 Å+ | 34 | 33 | 21 | 28 | 35 | 41 | 43 | 28 |
| Distribution, % of 30–300 Å | | | | | | | | |
| 30–50 Å | 17 | 9 | 8 | 10 | 10 | 7 | 9 | 9 |
| 50–60 | 29 | 14 | 11 | 11 | 11 | 7 | 9 | 10 |
| 60–70 | 29 | 30 | 19 | 19 | 26 | 16 | 18 | 18 |
| 70–80 | 12 | 29 | 25 | 24 | 27 | 27 | 23 | 27 |
| 80–90 | 2 | 4 | 16 | 15 | 8 | 19 | 14 | 14 |
| 90–100 | 2 | 4 | 7 | 5 | 3 | 5 | 7 | 6 |
| 100–150 | 5 | 4 | 9 | 9 | 7 | 10 | 10 | 8 |
| 150–200 | 2 | 3 | 2 | 3 | 3 | 4 | 4 | 4 |
| 200–300 | 2 | 4 | 3 | 5 | 6 | 4 | 7 | 4 |
| Pore Size Distribution Maximum, Å | 60 | 72 | 73 | 75 | 68 | 78 | 73 | 73 |

[a]4 hrs - 1400° F. - 0 psig

TABLE 7

Pore Structure of Thermally Treated[a] Mixed Sol Catalysts

| Synthetic Matrix $\frac{Al_2O_3}{SiO_2}$ | 0 | 0.38 | | 1.54 | |
|---|---|---|---|---|---|
| Example No. | 2 | 3 | | 5 | |
| Pore Volume, cc/gm | 0.18 | 0.37 | | 0.48 | |
| Distribution, % of 30 Å + | | | | | |
| 30–50 Å | 40 | 21 | | 8 | |
| 50–60 | 3 | 23 | | 12 | |
| 60–70 | 3 | 6 | | 17 | |
| 70–80 | 3 | 2 | | 5 | |
| 80–90 | 1 | 1 | | 1 | |
| 90–100 | 1 | 1 | | 2 | |
| 100–150 | 5 | 2 | | 2 | |
| 150–200 | 0 | 1 | | 1 | |
| 200–300 | 2 | 1 | | 1 | |
| 300 Å+ | 43 | 42 | | 50 | |
| Distribution, % of 30–300 Å | | | (steamed)[b] | | (steamed)[b] |
| 30–50 Å | 69 | 36 | (17) | 16 | (9) |
| 50–60 | 5 | 39 | (29) | 24 | (14) |
| 60–70 | 5 | 11 | (29) | 34 | (30) |
| 70–80 | 5 | 3 | (12) | 10 | (29) |
| 80–90 | 1 | 2 | (2) | 3 | (4) |
| 90–100 | 1 | 2 | (2) | 3 | (4) |
| 100–150 | 9 | 3 | (5) | 5 | (4) |
| 150–200 | 0 | 2 | (2) | 3 | (3) |
| 200–300 | 4 | 2 | (2) | 3 | (4) |
| Pore Size Distribution Maximum, Å | 30 | 53 | | 63 | |

[a] 0.5 hrs - 1200° F. - N₂, added to 100% steam
[b] 4 hrs - 1400° F. - 0 psig

TABLE 8

Pore Structure of Typical Commercial Catalysts

| Catalyst | A | | B | | C | | D | |
|---|---|---|---|---|---|---|---|---|
| Catalyst Type | Semi-Synthetic | | Clay | | Clay-Gel | | Semi-Synthetic | |
| Treatment | Thermal[a] | Steamed[b] | Thermal[a] | Steamed[b] | Thermal[a] | Steamed[b] | Thermal[a] | Steamed[b] |
| Pore Volume, cc/gm | 0.35 | 0.33 | 0.38 | 0.30 | 0.35 | 0.40 | 0.59 | 0.51 |
| Distribution, % of 30 Å+ | | | | | | | | |
| 30–50 Å | 22 | 12 | 6 | 8 | 12 | 9 | 36 | 11 |
| 50–60 | 11 | 7 | 1 | 1 | 5 | 4 | 6 | 11 |
| 60–70 | 8 | 7 | 1 | 1 | 4 | 4 | 4 | 8 |
| 70–80 | 7 | 7 | 1 | 2 | 4 | 4 | 4 | 6 |
| 80–90 | 4 | 5 | 1 | 1 | 2 | 2 | 2 | 2 |
| 90–100 | 3 | 5 | 1 | 1 | 2 | 2 | 2 | 4 |
| 100–150 | 8 | 15 | 3 | 4 | 8 | 10 | 4 | 9 |
| 150–200 | 3 | 5 | 2 | 4 | 6 | 6 | 2 | 3 |
| 200–300 | 3 | 4 | 4 | 5 | 5 | 8 | 2 | 3 |
| 300 Å+ | 30 | 33 | 79 | 73 | 51 | 51 | 37 | 40 |
| Distribution, % of 30–300 Å | | | | | | | | |
| 30–50 Å | 32 | 19 | 28 | 30 | 24 | 18 | 57 | 18 |
| 50–60 | 16 | 10 | 7 | 5 | 11 | 7 | 10 | 18 |
| 60–70 | 12 | 10 | 6 | 5 | 8 | 7 | 6 | 14 |
| 70–80 | 10 | 10 | 6 | 6 | 8 | 8 | 6 | 11 |
| 80–90 | 6 | 8 | 5 | 4 | 5 | 5 | 3 | 8 |
| 90–100 | 5 | 8 | 5 | 4 | 5 | 5 | 3 | 7 |
| 100–150 | 11 | 22 | 16 | 13 | 17 | 21 | 7 | 16 |
| 150–200 | 5 | 8 | 9 | 15 | 12 | 13 | 3 | 5 |
| 200–300 | 4 | 6 | 19 | 18 | 11 | 16 | 3 | 5 |

[a] 0.5 hrs - 1200° F. - N₂, added to 100% steam
[b] 4 hrs - 1400° F. - 0 psig

EXAMPLE 17

A catalyst containing 15% wt. REY incorporated in a silica-alumina-clay matrix derived from colloidal dispersions of silica and alumina and from Georgia kaolin clay was prepared as follows:

The matrix was formed by first preparing a dispersed alumina slurry by slowly adding 1555.6 gms (90% Al₂O₃) to a solution containing 93.3 gms of concentrated nitric acid (70% wt.) and 14093 gms of H₂O and then adjusting the pH to 4.0 with concentrated NH₄OH (29.9% wt.). This alumina dispersion was slowly added to a silica-clay dispersion formed by slurrying 1200 gms Georgia kaolin clay and 4666.7 gms colloidal silica (30.0% wt. SiO₂) in 11,522 gms H₂O. The appropriate amount of REY, described in Example 1A, was added to give 15% wt. REY in the total admixture. The mixture was then homogenized and spray dried at 700° F. inlet temperature and 350° F. outlet temperature.

EXAMPLE 18

A catalyst was prepared as in Example 17 except that prior to the addition of zeolite REY sufficient solid chloroplatinic acid was added to deposit 10 ppm Pt on the catalyst. The catalyst was then further processed as described in Example 17.

EXAMPLE 19

A portion of the catalyst described in Example 17 was contacted with a solution containing sufficient platinum acetyl acetonate dissolved in mixed xylenes to deposit 5 ppm Pt on the catalyst. The catalyst was then dried at 250° F. for about 18 hours. After drying the catalyst was heated to 980° F. and the xylene solution adsorbed in the pores of the catalyst allowed to undergo a cracking reaction on the catalyst. The catalyst was then regenerated at 980° F. with oxygen.

EXAMPLES 20–22

The freshly prepared catalysts in Examples 17–19 were each steamed for 4 hours at 1400° F. at 0 psig in 100% steam in a fixed fluidized bed. In each instance, the catalysts were preheated to 1350° F. in steam, then to 1400° F. in nitrogen before beginning the 4 hours steaming. The steamed catalysts were then tested for cracking activity and selectivity by cracking a Sour Heavy Gas Oil (SHGO), having the properties hereinafter set forth in Table 9 at 960° F., 3 C/O, 1.0 minutes on stream, in a fixed fluidized bed test unit.

These coked catalysts were tested for CO oxidation activity by regenerating 4 grams total of coked and clean burned blended to 0.65% wt. carbon at 1215° F. with air. The $CO_2$ and CO content of the regeneration gas is continuously determined and an overall $CO_2/CO$ mole ratio is calculated. CO conversion is determined by passing 215 cc/min. of a gas containing 8.31 mol % $CO_2$, 4.01 mol % CO and 4.02 mol % $O_2$ over the regenerated catalyst at 1215° F. The overall $CO_2/CO$ ratio and the CO conversion for these catalyst samples are given in Table 10 along with cracking activity and selectivity.

TABLE 9

| Chargestock | S.H. Gas Oil |
|---|---|
| Gravity, °API | 24.3 |
| Aniline Point, °F. | 171 |
| Sulfur, % wt. | 1.87 |
| Nitrogen, % wt. | 0.03 |
| Basic Nitrogen, ppm | 327 |
| Viscosity, KV at 210° F. | 3.62 |
| Bromine No. | 4.2 |
| R. I. at 70° F. | 1.50801 |
| Hydrogen, % wt. | 12.3 |
| M. W. | 358 |
| Pour Point, °F. | 85 |
| Specific Gravity, 60° F. | 0.9082 |
| Distillation | |
| IBP | 414 |
| 5% volume | 548 |
| 10% volume | 614 |
| 20% volume | 667 |
| 30% volume | 701 |
| 40% volume | 733 |
| 50% volume | 767 |
| 60% volume | 801 |
| 70% volume | 839 |
| 80% volume | 877 |
| 90% volume | 924 |
| 95% volume | 956 |
| Paraffins, % wt. | 23.5 |
| Naphthenes | 32.0 |
| Aromatics | 44.5 |
| $C_A$ | 18.9 |

TABLE 10

| | Ex. 20 | Ex. 21 | Ex. 22 |
|---|---|---|---|
| Treatment: | | | |
| Hours | 4.0 | 4.0 | 4.0 |
| Temp, Deg. F. | 1400 | 1400 | 1400 |
| % Steam | 100 | 100 | 100 |
| Cat/Oil | 2.99 | 2.99 | 3.00 |
| WHSV | 20.09 | 20.09 | 20.00 |
| Reaction Temp, Deg. F. | 949 | 947 | 941 |
| Conversion, % Vol. | 72.9 | 76.1 | 74.1 |
| C5+ Gasoline, % Vol. | 57.2 | 59.3 | 57.6 |
| Total C4, % Vol. | 16.3 | 17.4 | 17.4 |
| Dry Gas, % Wt. | 8.2 | 8.9 | 8.5 |
| Coke, % Wt. | 4.34 | 4.65 | 4.36 |
| C—On-Cat. Final, % Wt. | 1.31 | 1.33 | 1.26 |
| N—C5, % Vol. | 1.0 | .7 | .7 |
| I—C5, % Vol. | 6.6 | 7.5 | 6.4 |
| C5=, % Vol. | 3.8 | 3.3 | 3.4 |
| N—C4, % Vol. | 1.8 | 1.7 | 1.7 |
| I—C4, % Vol. | 7.8 | 8.8 | 8.2 |
| C4=, % Vol. | 6.7 | 6.9 | 7.5 |
| C3, % Vol. | 2.7 | 3.0 | 2.6 |
| C3=, % Vol. | 6.9 | 7.6 | 7.8 |
| C2, % Wt. | .5 | .6 | .6 |
| C2=, % Wt. | .7 | .7 | .6 |
| C1, % Wt. | .7 | .7 | .6 |
| H2, % Wt. | .02 | .04 | .05 |
| H2S, % Wt. | .77 | .79 | .75 |
| Hydrogen Factor | 15 | 22 | 33 |
| Recovery, % Wt. | 100.0 | 95.1 | 96.8 |
| Catalyst Example | 17 | 18 | 19 |
| Oxidation Promoter (ppm Pt) | — | 10 Solid $H_2 PtCl_6$ | 5 Pt acetyl acetonate |
| Co Oxidation Activity | | | |
| $CO_2/CO$ mole ratio | 1.3 | 27.1 | 4098 |
| CO Conversion, % | 36 | 46 | 100 |

Examples 20 and 21 are REY containing catalysts prepared from colloidal dispersions of silica and alumina with added clay. Example 17 is unpromoted and Example 18 was promoted by addition of chloroplatinic acid to the silica-alumina-clay mixture before zeolite addition and spray drying. From the data in Table 10 it can be seen that the catalyst in which promoter alone was added to a precursor of the final catalyst matrix (Example 18) possesses CO oxidation activity.

Example 22 depicts a semi-synthetic REY containing catalyst promoted by impregnation a metal containing compound (platinum acetyl acetonate) dissolved in a non-aqueous media (xylene). Comparison of the CO-oxidation activity of this catalyst with its base (Example 20) in Table 10 shows that this method of promotion is very effective.

EXAMPLE 23

The catalyst of Example 13 was mulled with water to form an extrudate mass containing 63% solids and extruded to form pellets of 1/32-inch diameter. The pellets were dried at 250° F., then steam treated for 20 hours in 100% steam at 1200° F. and atmospheric pressure. The steamed pellets were impregnated first with an aqueous solution of ammonium tungstate to incipient wetness, and dried and then further impregnated to incipient wetness with an aqueous solution of nickel nitrate. After final drying at 250° F., the Ni and W impregnated catalyst was calcined at 1000° F. for 3 hours in air. The finished catalyst had a surface area of 146 m²/gm and NiO and $WO_3$ contents of 3.7 and 10.7 weight percent, respectively.

The catalyst was then tested for upgrading of petroleum resids. The catalysts was tested in a down-flow, fixed-bed pilot unit at constant conditions (600 psig total pressure, 775° F. and 0.3 LHSV) with Arabian Light vacuum resid. The chargestock composition is shown in Table 11. The catalyst was presulfided at 600° F. with a 2% $H_2S/H_2$ mixture at 500 psig of the total pressure. The results over a 6 day test period are shown in Table 12.

The catalyst demonstrated a very high initial activity; it achieved 80% removal of sulfur and metals (Ni+V) at 0.7 day on stream. Although a rapid deactivation was observed in the first two days on stream, the catalyst activity remained constant after three days on stream. After 6 days on stream, it was calculated that 2200 ppm of metals (Ni+V) had been accumulated on the catalysts, and the catalyst still achieved 58% desulfurization and 40% demetalation.

TABLE 11

| Chargestock Properties | |
|---|---|
| Gravity, °API | 8.3 |
| Hydrogen, wt % | 10.73 |
| Sulfur, wt % | 3.80 |
| Nitrogen, wt % | 0.30 |
| CCR, wt % | 14.37 |
| Nickel, ppm | 17 |
| Vanadium, ppm | 65 |
| Distillation, °F. | |
| IBP | 409 |
| 5% | 859 |
| 10% | 899 |

TABLE 11-continued

| 20% | 976 |
|---|---|

TABLE 12

| Low Pressure Hydrotreating of Arabian Light Vacuum Resid | | | | | | | | |
|---|---|---|---|---|---|---|---|---|
| | Charge | 23-1 | 23-2 | 23-3 | 23-4 | 23-5 | 23-6 | 23-7 |
| Operating conditions* | | | | | | | | |
| Total Pressure, psig | — | — | — | — | 600 | — | — | — |
| Temperature, °F. | — | — | — | — | 775 | — | — | — |
| LHSV, Hr$^{-1}$ | | 0.23 | 0.33 | 0.44 | 0.27 | 0.25 | 0.28 | 0.26 |
| Hydrogen Circ., SCF/B | — | — | — | — | 5000 | — | — | — |
| Days on Stream | | 0.7 | 1.2 | 2.0 | 3.0 | 4.0 | 5.0 | 6.0 |
| Product Properties | | | | | | | | |
| Gravity °API | 8.3 | 23.0 | 18.5 | 14.1 | 15.6 | 16.2 | 15.5 | 15.6 |
| Hydrogen, wt % | 9.75 | 11.58 | 11.29 | 10.90 | 11.20 | 11.19 | 11.01 | 11.15 |
| Sulfur, wt % | 3.80 | 0.64 | 1.27 | 2.26 | 1.67 | 1.51 | 1.69 | 1.69 |
| Nitrogen, wt % | 0.30 | 0.18 | 0.20 | 0.23 | — | 0.24 | 0.27 | 0.25 |
| CCR, wt % | 14.37 | 5.3 | 7.9 | 10.4 | 9.2 | 10.6 | 11.5 | 11.1 |
| Nickel, ppm | 17 | 9 | 16 | 19 | 17 | 16 | 16 | 16 |
| Vanadium, ppm | 65 | 6 | 17 | 40 | 30 | 27 | 32 | 32 |
| **Activity Correlated to 0.3 LHSV | | | | | | | | |
| Desulfurization, % | | 84 | 68 | 41 | 58 | 62 | 58 | 57 |
| Denitrogenation, % | | 37 | 29 | 17 | — | 15 | 4 | 11 |
| Demetalation, % | | 83 | 61 | 55 | 45 | 50 | 44 | 44 |

*The catalyst was presulfided with a 2% H$_2$S/H$_2$ mixture at 600° F. and evaluated in a down-flow fixed bed pilot unit.
**Assuming first-order reaction.

The data disclosed hereinabove dramatically illustrates the advantages of catalysts prepared in accordance with this invention. The mixed colloidal dispersions herein are formed by the novel procedure of mixing preformed, monodisperse colloidal dispersions of silica and alumina. Consequently gel formation does not occur to an appreciable extent. Additionally clay is not an integral part of the invention but is simply used as a weighting agent. The resultant catalysts are substantially devoid of foreign cations and anions, e.g., Na, SO$_4$; so that further processing (exchange, washing) is unnecessary. The pore structure is unusual and very stable to hydrothermal deactivation, so that activity loss is minimized over a wide temperature range. The catalysts have desirable high density and excellent attrition resistance and other properties relevant for cracking catalysts—selectivity, metal resistance—are excellent, as discussed hereinabove.

Such variations and modifications as fall within the general scope of this invention as readily understood by one of ordinary skill in the art are included herein.

What is claimed is:

1. A composition adapted for application as a catalyst or catalyst support which is prepared by blending a mixture of components comprising (1) about 1–99 weight percent of colloidal dispersions of alumina particles, (2) about 1–99 weight percent of colloidal dispersions of silica particles, (3) about 1–75 weight percent of a particulate weighting agent, and (4) about 1–75 weight percent of crystalline aluminosilicate zeolite hydrocarbon conversion component selected from the group consisting of X, Y, erionite, mordenite and faujasite, and thereafter drying the resultant composite; said alumina and silica particles having diameters in the range of 10–10,000 Å and said particles having at least 40 weight percent of the 30–300 Å diameter pore volume in the range between 60–80 Å, and at least 25 percent of total pore volume in excess of 30 Å being in the range of said 60–80 Å.

2. A composition in accordance with claim 1 which contains between about 20–90 weight percent of the colloidal alumina particles, and between about 10–80 weight percent of the colloidal silica particles, and between about 5–35 weight percent of the zeolite component.

3. A composition in accordance with claim 1 wherein the weighting agent is a particulate clay selected from the group consisting of attapulgite, bauxite, montmorillonite, kaolin and fuller's earth.

4. A composition in accordance with claim 1 wherein the zeolite component is a rare earth or ammonium exchanged form of X or Y zeolite.

5. A composition in accordance with claim 1 wherein the non-zeolitic components are amorphous in form.

6. A composition comprising a cracking catalyst and a catalyst support or matrix therefor prepared in accordance with claim 1.

7. A composition in accordance with claim 6 wherein the non-zeolitic components of the catalyst support or matrix are amorphous in form.

8. A composition in accordance with claim 6 wherein the weighting agent is clay.

9. A composition in accordance with claim 6 which contains between about 0.01–100 ppm of platinum group metal as a promoting agent.

10. A composition in accordance with claim 9 wherein the promoting agent is platinum.

11. A composition comprising a hydroconversion catalyst support or matrix prepared in accordance with claim 1 and a hydrogenation component selected from Group VIB and VIII metals.

12. A composition in accordance with claim 11 wherein the non-zeolitic components of the catalyst support or matrix are amorphous in form.

13. A composition in accordance with claim 11 wherein the weighting agent is clay.

14. A composition adapted for application as a catalyst or catalyst support which is prepared by blending a mixture of components comprising (1) about 20–90 weight percent of colloidal dispersion of alumina particles, and (2) about 10–80 weight percent of colloidal dispersion of silica particles, and thereafter drying the resultant composite; said alumina and silica particles having diameters in the range of 10–10,000 Å and said composite having at least 40 weight percent of the 30–300 Å diameter pore volume in the range between 60–80 Å, and at least 25 percent of total pore volume in excess of 30 Å being in the range of said 60–80 Å.

15. A composition in accordance with claim 14 which contains between about 1–75 weight percent of a particulate weighting agent, based on composition weight.

16. A composition in accordance with claim 15 wherein the weighting agent is clay.

17. A composition in accordance with claim 14 which additionally contains a catalytic component selected from Group VIB and Group VIII metals.

18. A composition in accordance with claim 14 which contains between about 1–75 weight percent of a crystalline aluminosilicate zeolite hydrocarbon conversion component.

* * * * *